(12) United States Patent
Hudman

(10) Patent No.: US 8,238,029 B2
(45) Date of Patent: Aug. 7, 2012

(54) DICHROIC FILTER LASER BEAM COMBINING

(75) Inventor: Joshua M. Hudman, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 405 days.

(21) Appl. No.: 12/618,194

(22) Filed: Nov. 13, 2009

(65) Prior Publication Data

US 2011/0116169 A1    May 19, 2011

(51) Int. Cl.
*G02B 27/14* (2006.01)
(52) U.S. Cl. .......................... 359/634; 359/640
(58) Field of Classification Search ........... 359/634–640
See application file for complete search history.

(56) References Cited

U.S. PATENT DOCUMENTS

| | | | |
|---|---|---|---|
| 4,806,750 A * | 2/1989 | Vincent | 250/226 |
| 5,005,935 A * | 4/1991 | Kunikane et al. | 398/86 |
| 5,828,497 A | 10/1998 | Neumann et al. | |
| 6,624,949 B2 * | 9/2003 | Roddy et al. | 359/634 |
| 7,325,957 B2 * | 2/2008 | Morejon et al. | 362/555 |
| 7,995,279 B2 * | 8/2011 | Huibers et al. | 359/634 |

FOREIGN PATENT DOCUMENTS

EP    1164409    12/2001

* cited by examiner

*Primary Examiner* — Thomas K Pham
*Assistant Examiner* — Vipin Patel
(74) *Attorney, Agent, or Firm* — Kevin D. Wills

(57) ABSTRACT

Briefly, in accordance with one or more embodiments, a dichroic optic having a first side and a second side opposite to the first side, wherein the second side has an optical filter, wherein each of a light beam having a first wavelength, a second wavelength and a third wavelength enter, exit or reflect from the dichroic optic only from at least one of the first or second sides, wherein prior to incidence on the dichroic optic each of the light beams having the first, second and third wavelengths are non-collinear with each other, wherein the light beam having the first wavelength and the light beam having the second wavelength are substantially collinear within the dichroic optic, wherein the optical filter has a response capable of transmitting at least one of the light beam having the first wavelength and the light beam having the second wavelength, while reflecting the light beam having the third wavelength, and wherein the light beam having the first wavelength, the second wavelength, and the third wavelength are combined in a substantially collinear manner.

20 Claims, 11 Drawing Sheets

DICHROIC FILTER LASER BEAM COMBINING

BACKGROUND

Laser beams in a scanned beam display may be combined via different approaches. In such beam combining systems, one or more dichroic filters may be utilized for one or more laser beams. For example, one approach involves using a separate dichroic filter for each laser beam wherein the dichroic filters have optical coatings optimized for each wavelength of its corresponding laser. However, using separate filters involves tight tolerances that should not fluctuate over time and/or temperature. Another approach involves using a slab combiner comprising two or more optical components that are bonded together. However, such bonded optics may be somewhat complex and/or too costly to fabricate. Yet another approach involves using a cube to combine multiple colors. However, such cubes are likewise complex and/or costly to fabricate.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
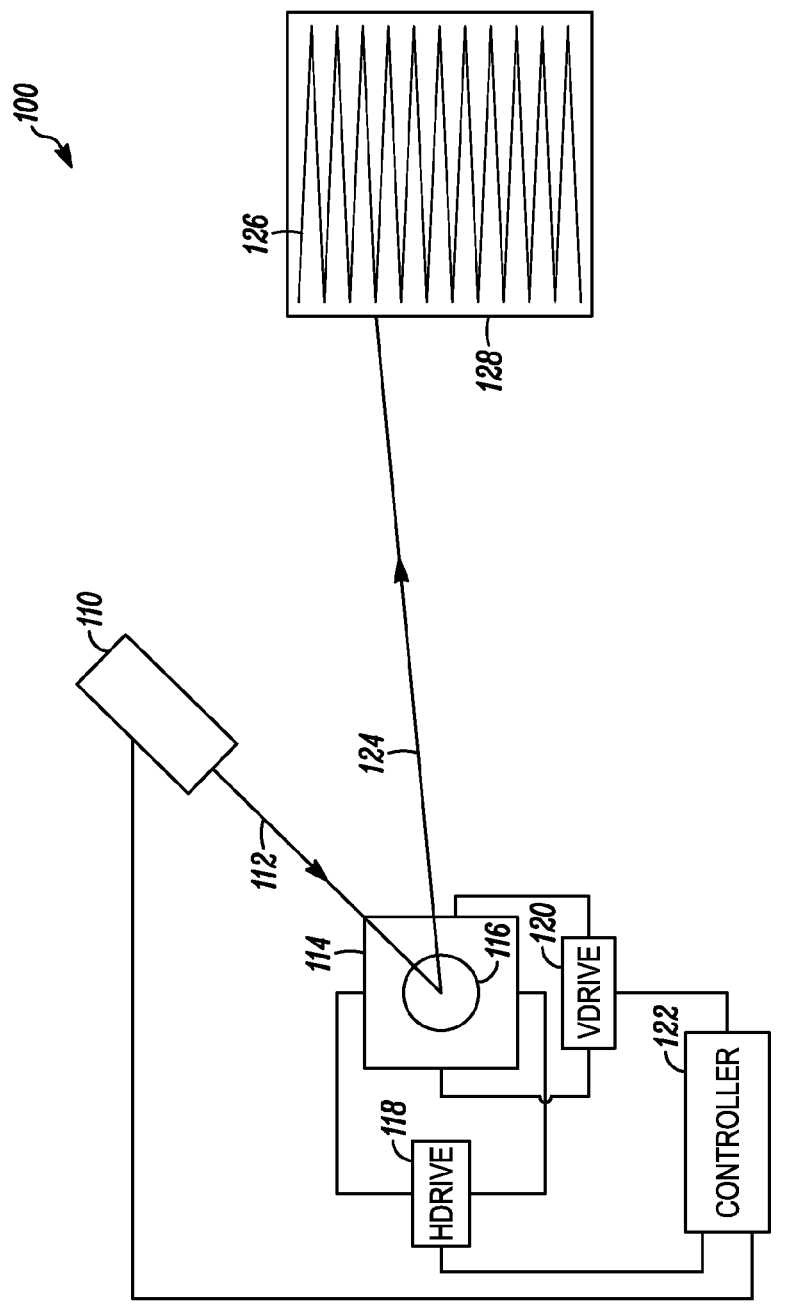
FIG. 1 is a diagram of a scanned beam display in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on", "overlying", and "over" may be used in the following description and claims. "On", "overlying", and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include", along with their derivatives, may be used and are intended as synonyms for each other.

Referring now to FIG. 1, a diagram of a scanned beam display in accordance with one or more embodiments will be discussed. Although FIG. 1 illustrates one type of a scanned beam display system for purposes of discussion, for example a microelectromechanical system (MEMS) based display, it should be noted that other types of scanning displays including those that use two uniaxial scanners, rotating polygon scanners, or galvonometric scanners as well as systems that use the combination of a one-dimensional spatial light modulator with a single axis scanner as some of many examples, may also utilize the claimed subject matter and the scope of the claimed subject matter is not limited in this respect. Furthermore, projectors that are not scanned beam projectors but rather have two-dimensional modulators that introduce the image information in either the image plane or Fourier plane and which introduce color information time sequentially or using a filter mask on the modulator as some of many examples, may also utilize the claimed subject matter and the scope of the claimed subject matter is not limited in this respect. Details of operation of scanned beam display are discussed, below.

As shown in FIG. 1, scanned beam display 100 comprises a light source or laser beam system 110, which may be a laser light source such as a laser or the like, capable of emitting a beam 112 which may comprise a laser beam. In general, scanned beam display 100 may also be referred to as a projector. In some embodiments, light source 110 may comprise two or more light sources, such as in a color system having red, green, and blue light sources, wherein the beams from the light sources may be combined into a single beam. In one or more embodiments, light source 110 may include a first full color light source such as a red, green, and blue light source, and in addition may include a fourth light source to emit an invisible beam such as an ultraviolet beam or an infrared beam. The beam 112 is incident on a scanning platform 114 which may comprise a microelectromechanical system (MEMS) based scanner or the like in one or more embodiments, and reflects off of scanning mirror 116 to generate a controlled output beam 124. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon device, or other similar scanning or modulating devices. A horizontal drive circuit 118 and/or a vertical drive circuit 120 modulate the direction in which scanning mirror 116 is deflected to cause output beam 124 to generate a raster scan 126, thereby creating a displayed image, for example on a display screen and/or image plane 128. A display controller 122 controls horizontal drive circuit 118 and vertical drive circuit 120 by converting pixel information of the displayed image into laser modulation synchronous to the scanning platform 114 to write the image information as a displayed image based upon the position of the output beam 124 in raster pattern 126 and the corresponding intensity and/or color information at the corresponding pixel in the image. Display controller 122 may also control other various functions of scanned beam display 100.

In one or more embodiments, a horizontal axis may refer to the horizontal direction of raster scan 126 and the vertical axis may refer to the vertical direction of raster scan 126. Scanning mirror 116 may sweep the output beam 124 horizontally at a relatively higher frequency and also vertically at a relatively lower frequency. The result is a scanned trajectory of laser beam 124 to result in raster scan 126. The fast and slow axes may also be interchanged such that the fast scan is in the vertical direction and the slow scan is in the horizontal direction. However, the scope of the claimed subject matter is not limited in these respects.

In one or more particular embodiments, the scanned beam display 100 as shown in and described with respect to FIG. 1 may comprise a pico-projector developed by Microvision Inc., of Redmond, Wash., USA, referred to as PICOP™. In such embodiments, light source 110 of such a pico-projector may comprise one red, one green, one blue, and one invisible wavelength laser, with a lens near the output of the respective lasers that collects the light from the laser and provides a very low numerical aperture (NA) beam at the output. The light from the lasers may then be combined with dichroic elements, such as dichroic optic 322, dichroic optic 710, and/or dichroic optic 810 as described below, into a single white or composite output beam 112. Using a beam splitter and/or basic fold-mirror optics, the combined beam 112 may be relayed onto biaxial MEMS scanning mirror 116 disposed on scanning platform 114 that scans the output beam 124 in a raster pattern 126. Modulating the lasers synchronously with the position of the scanned output beam 124 may create the projected image. In one or more embodiments the scanned beam display 100, or engine, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects.

In one or more embodiments, the technology utilized for the red and blue lasers in scanned beam display 100 may be substantially similar to the technology of similar lasers that are used for the optical disk storage devices, with the main difference being a slight shift in the particular wavelengths provided by the lasers. Such lasers may be fabricated from materials such as gallium aluminum indium phosphide (GaAlInP) for red laser diodes and gallium nitride (GaN) for blue laser diodes. In one or more embodiments, the technology for green lasers may be based on infrared or near-infrared lasers developed for the telecom industry. Near-infra-red laser diodes with very high modulation bandwidths may be utilized in combination with a frequency-doubling crystal, for example periodically poled lithium niobate ($LiNbO3$), to produce a green laser that is capable of being directly modulated. The choice of which wavelength to use for the lasers may be based at least in part on at least two considerations. First is the response of the human eye, known as the photopic response, to different wavelengths. This response is an approximate Gaussian curve that peaks at or near the green-wavelength region and falls off significantly in red and blue regions. The amount of red and blue power needed to get a white-balanced display may vary rapidly with wavelength. For example, eye response increases by a factor of two when the wavelength is changed from 650 nanometers (nm), the wave-length used for digital video disc (DVD) drives, to 635 nm. Such a change in wavelength allows the required laser power to drop by the same factor, thereby resulting in scanned beam display 100 that is able to operate at lower power. Similarly, the blue laser may be chosen to have as long a wavelength as possible. Currently, blue lasers in the range of 440 to 445 nm are typical, and eventually practical blue lasers having longer wavelengths in the range of 460 to 470 nm may be provided. The second consideration is color gamut. Since the photopic response is at or near peak value through the green wavelength range, the green wavelength may be chosen to enhance the color of the display. For example, green lasers at or near 530 nm may be utilized for maximizing or nearly maximizing the color gamut. Since the ability to directly modulate the lasers is a main feature of scanned beam display 100, pixel times at or near the center of a Wide Video Graphics Array (WVGA) scanned display may be on the order of 20 nanoseconds (ns). As a result, the lasers may have modulation bandwidths on the order of about 100 MHz. It should be noted that these are merely examples for the types and characteristics of the lasers that may be utilized in scanned beam display 100, and the scope of the claimed subject matter is not limited in these respects. In one or more embodiments, the fourth, invisible laser may comprise an ultraviolet (UV) laser having a wavelength of about 380 or 390 nm or so and may range as low as about 200 nm up to about 400 nm or so, and/or generally about 400 nm or less. Such a UV laser may comprise, for example, Gallium Aluminum Nitride (GaAlN) or Gallium Indium Nitride (GaInN), among many examples. In alternate embodiments, the fourth, invisible laser may comprise an infrared (IR) laser having a wavelength of about 850 nm or so and in general may have a wavelength of about 750 nm or greater such as about 750 nm to about 1550 nm or so. Such an IR laser may comprise, for example, aluminum gallium arsenide (AlGaAs), indium gallium arsenide phosphate (InGaAsP), a vertical cavity surface emitting laser (VCSEL), a quantum cascade laser, a hybrid silicon laser, and so on. The choice of the invisible laser may be based on multiple considerations which include the efficiency of the laser wavelength for exciting the photoluminescent material in the screen, commercial availability of the laser, and/or laser power.

In one or more embodiments of scanned beam display 100, the remainder of the optics engine operates to generate a single pixel at a particular position of the output beam 124 in raster scan 126. All three lasers may be driven simultaneously at levels to create a proper color mix for each pixel to produce brilliant images with the wide color gamut available from red, green, blue (RGB) lasers in addition to the invisible wavelength laser. Direct-driving of the lasers pixel-by-pixel at or near the levels involved for each pixel provides suitable power efficiency and inherently high contrast. As a result, in such embodiments the efficiency of scanned beam display may be maximized or nearly maximized since the lasers may be only on at the level needed for each pixel. The contrast may be high because the lasers are completely off for black pixels rather than using, for example, a spatial light modulator (SLM) to deflect or absorb any excess intensity. The single-pixel collection optics may be optimized to take the particular beam properties of the red, green, and/or blue laser and relay it through the scanned beam display and onto the display screen 128 with high efficiency and/or image quality. The pixel profile may be designed to provide high resolution and infinite focus with a smooth non-pixelated image. In some embodiments, with a relatively simple optomechanical design for scanned beam display 100, at least some of the display complexity may be handled by the electronics systems to control accurate placement of pixels and to modulate the laser at pixel rates.

In one or more embodiments of a raster-scanned beam display 100, no projection lens may be utilized or otherwise needed. In such embodiments, the projected output beam 124 directly leaves the scanned beam display 100 and creates an image on whatever display screen 128 upon which output beam 124 is projected. Because of the scanned single pixel design, light-collection efficiency may be kept high by placing the collection lenses near the output of the lasers while the NA of output beam 124 is very low. By design, the rate of expansion of the single-pixel beam may be matched to the rate that the scanned image size grows. As a result, the projected image is always in focus. This special property of scanned beam display 100 comes from dividing the task of projecting an image into using a low NA single-pixel beam to establish the focus and a two-dimensional (2D) scanner to paint the image. In particular embodiments, the scanning platform 114 may implement the role of fast projection optics by producing an image that expands with a 43° horizontal projection angle. Such an arrangement may not be achieved in more traditional projector designs where projection optics may be used to image a spatial light modulator onto the projection screen due to conflicting constraints on the projection lens. On the one hand, a short focal length lens may be utilized to create an image that grows quickly with projection distance, while on the other hand, the lens aperture is typically large to maximize the projector's brightness. Such constraints may involve a fast projection lens with F/2 lenses being typical. Depth of focus is proportional to F-stop. The trade-off for traditional projector designs balances the rate the image grows with distance, light efficiency and/or depth of focus.

In some embodiments of scanned beam display 100, the spot size as a function of projection distance may grow at a rate matched or close to the growth of a single pixel. Assuming a moderately fast F/4 projection lens and a focal length chosen to give the same 43° rate or growth with projection distance for the projected image, the depth of locus for an imaging-type projector is greatly reduced compared to the scanned laser. To the user, this means that the typical imaging-type projector may be refocused as the projection distance is changed, and that portions of the image may be out of focus when one projects onto surfaces that present a range of projection distances within the image, for example projecting onto a flat surface at an angle or onto surfaces with a significant three-dimensional (3D) profile, although the scope of the claimed subject matter is not limited in this respect.

Figure 2:
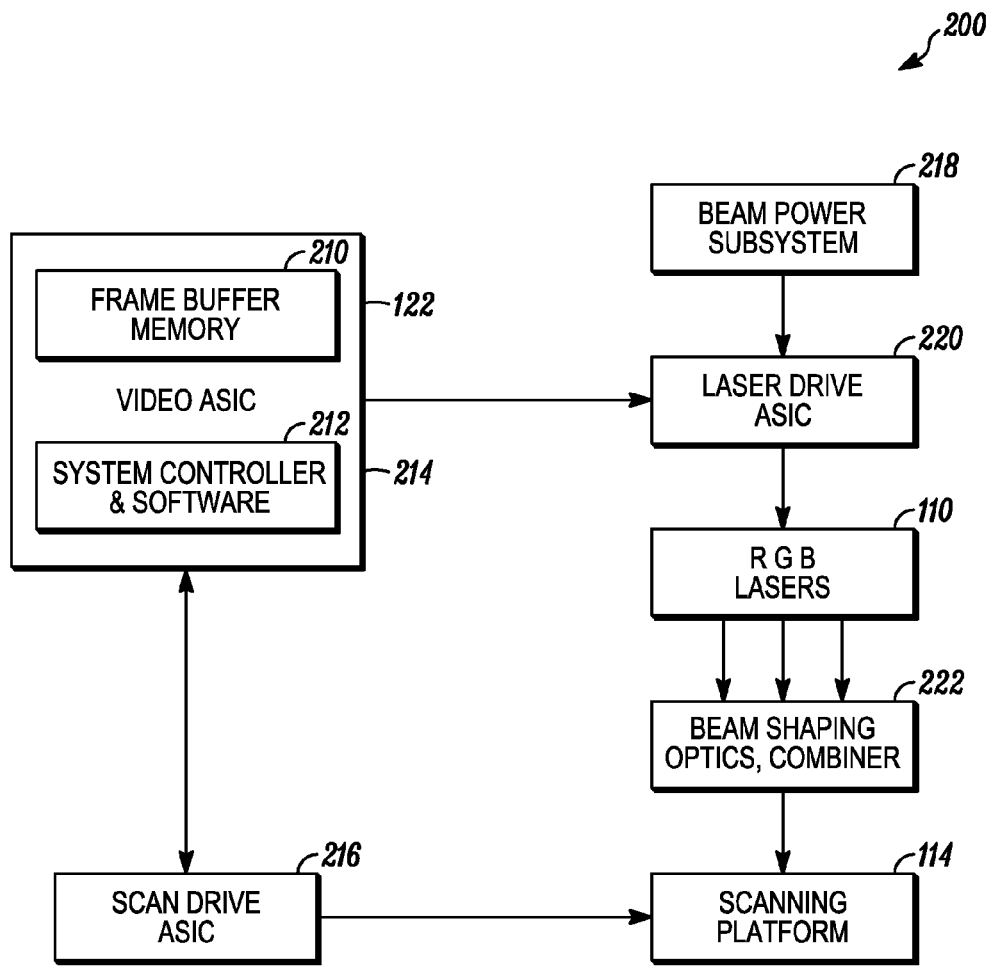
FIG. 2 is a block diagram of the electronic circuits of a scanned beam display in accordance with one or more embodiments.

Referring now to FIG. 2, a block diagram of the electronic circuits of a scanned beam display in accordance with one or more embodiments will be discussed. With the simplification of the optomechanical projector engine design, a greater portion of the display emphasis may be shifted to the electronics. This allows the physical size of the projector engine to be relatively minimized to accommodate hand-held consumer products. The electronics, which can be integrated more straight-forwardly into consumer products, take over tasks that are done optically with other projector designs. Some of the tasks that are shifted include pixel positioning, color alignment and brightness uniformity. In some embodiments of scanned beam display 100, the video processor and controller 122 for scanning platform 114 may be implemented as one or more custom application-specific integrated circuits (ASICs) that drive the scanned beam display 100 of FIG. 1.

In one or more embodiments, such an electronics system 200 may comprise scan drive ASIC 216 which may comprise horizontal drive circuit 118 and vertical drive circuit 120 as shown in FIG. 1 for driving scanning platform 114 to generate a raster scan 126. In some embodiments, scan drive ASIC 218 may drive scanning platform 114 under closed loop control. The horizontal scan motion may be created by driving the horizontal axis of scanning platform 114 at its resonant frequency which typically may be about 18 kHz for a Wide Video Graphics Array (WVGA) type scanner. The horizontal scan velocity may vary sinusoidally with position. In particular embodiments, scan drive ASIC 216 may utilize feedback from sensors on scanning platform 114 to keep the system on resonance and/or at fixed scan amplitude. The projected image is drawn in both directions as scanning platform 114 sweeps the beam back and forth. Such an arrangement may increase the efficiency of scanning platform 114 in at least two ways. First, by running on resonance the power required to drive the scan mirror may be reduced and/or minimized. However, in some embodiments scanning platform 114 may be non-resonantly driven. Second, bi-directional video increases and/or maximizes the laser use efficiency by minimizing the video blanking interval. As a result, the image projected by scanned beam display 100 may be brighter for a given power output of the four lasers 110, although the scope of the claimed subject matter is not limited in these respects. In some embodiments, the vertical scan direction may be driven with a standard sawtooth waveform to provide constant velocity from the top to the bottom of the image and a rapid retrace back to the top to begin a new frame. The vertical scan motion also may be managed in closed loop fashion by scan drive ASIC 216 based at least in part on position feedback from scanning platform 114 to maintain a smooth and/or linear trajectory. The frame rate typically may be 60 Hz for an 848×480 WVGA resolution. The frame rate may be increased if the projector is used in lower resolution applications, although the scope of the claimed subject matter is not limited in this respect. Further details of the scan drive waveforms are shown in and described with respect to FIG. 3, below.

In one or more embodiments, controller 122 of FIG. 1 may comprise a video ASIC 214 as shown in FIG. 2 as an embodiment of controller 122. In some embodiments, video ASIC 214 accepts either red, green, blue (RGB) and/or luma/chrominance (YUV) video signal inputs, in addition to a monochrome signal for the invisible wavelength laser. Video ASIC 214 may include a frame buffer memory 210 to allow artifact free scan conversion of input video. Gamma correction and/or color space conversion may be applied to enable accurate mapping of input colors to the wide laser color gamut. An optional scaling engine may be provided for upconverting lower resolution video content. In one or more embodiments, video ASIC 214 may implement a Virtual Pixel Synthesis (VPS) engine that utilizes high-resolution interpolation to map the input pixels to the sinusoidal horizontal trajectory of scanning platform 114. Such a VPS engine is an example of how functions of scanned beam display 100 may be shifted from being implemented in optics to being implemented electronics by electronics system 200 in a scanned laser paradigm. The VPS engine effectively may map the input pixels onto a high-resolution virtual coordinate grid. Besides enabling the repositioning of video information with subpixel accuracy onto the sinusoidal scan, the VPS engine may further optimize the quality of the projected image. Brightness uniformity also may be managed in the VPS engine by adjusting coefficients that control the overall brightness map for the scanned beam display 100.

In one or more embodiments, the VPS engine implemented by video ASIC 214 may compensate optical distortions, for example keystone, parallelogram, and/or some types of pincushion distortion, and/or any arbitrary or intentional type of distortion including but not limited to distortion from varying surface profile or relief, wherein the VPS engine may be utilized to adjust the pixel positions. The VPS engine also may allow the pixel positions for each color to be adjusted independently. Such an arrangement may simplify the manufacturing alignment of scanned beam display 100 by relaxing the requirement that the three laser beams of laser 110 be perfectly mechanically aligned. The positions of the red, green, blue, and/or invisible light pixels may be adjusted electronically to bring the video into perfect, or nearly perfect, alignment, even if the laser beams are not themselves sufficiently aligned. Such an electronic pixel alignment capability also may be utilized to compensate for some types of chromatic aberration if scanned beam display 100 is deployed as an engine in a larger optical system, although the scope of the claimed subject matter is not limited in this respect. In some embodiments, mapping from digital video coding performed by video ASIC 214 to laser drive ASIC 220 may be performed by an Adaptive Laser Drive (ALD) system implemented by system controller and software 212. In some embodiments, the ALD may comprise a closed-loop system that utilizes optical feedback from each laser to actively compensate for changes in the laser characteristics over temperature and/or aging. Such an arrangement may ensure optimum, or nearly optimum, brightness, color and/or grayscale performance. Unlike other display systems, optical feedback further may be incorporated to ensure optimum color balance and/or grayscale. Other electronic blocks in electronics system 200 may include beam power subsystem 218 to maintain the output power of lasers 100 within safe levels, and/or beam shaping optics and combiner 222 to shape and/or combine the beams from individual lasers 110 into a single beam applied to scanning platform 114. However, FIG. 2 shows one example arrangement of electronics system 200 of a scanned beam display, and the scope of the claimed subject matter is not limited in these respects.

In one or more embodiments, the components of scanned beam display 100 and/or components of electronics system 200 may be arranged for operation in a mobile format or environment. Such an example scanned beam display 100 may include the following specifications. The height or thickness and/or volume of scanned beam display 100 may be minimized or nearly minimized, for example a height from about 7 to 14 mm and in overall volume from 5 to 10 cubic centimeters (cc). Brightness may be affected by the available brightness of the light sources, either lasers or light emitting diodes (LEDs), the optical efficiency of the projector design, and/or lower-power operation in order to maximize battery life. In some embodiments, the brightness of the image projected by scanned beam display may be in the range of about 5 to 10 lumens. For image size, a projection angle in the range of 30 to 45 degrees may be utilized and in one or more particular embodiments the projection angle may be about 53 degrees with a one-to-one (1:1) distance to image size ratio, although the scope of the claimed subject matter is not limited in these respects. For mobile applications, scanned beam display 100 may provide focus free operation wherein the distance from the display to the displayed image will likely change often. The wide screen format generally may be desirable for viewing video content wherein scanned beam display 100 may provide resolutions from quarter video graphics array (QVGA) comprising 320×240 pixels to wide video graphics array (WVGA) comprising 848×480 pixels, as merely some examples. In some embodiments, scanned beam display 100 typically utilizes either color lasers and/or red, green, blue, and invisible wavelength LEDs for light sources. In both embodiments, the result is large color gamuts that far exceed the usual color range typically provided televisions, monitors, and/or conference-room-type projectors. In some embodiments, white LEDs may be utilized used with color filters to yield a reduced color gamut. Contrast likewise may be maximized, or nearly maximized. Contrast may be referred to as the dynamic range of scanned beam display 100. In one or more embodiments, a target specification for power consumption may be to provide a battery life sufficient to watch an entire movie, which may be at least about 1.5 hours. It should be noted that these are merely example design specifications for scanned beam display 100, and the scope of the claimed subject matter is not limited in these respects.

Figure 3A:
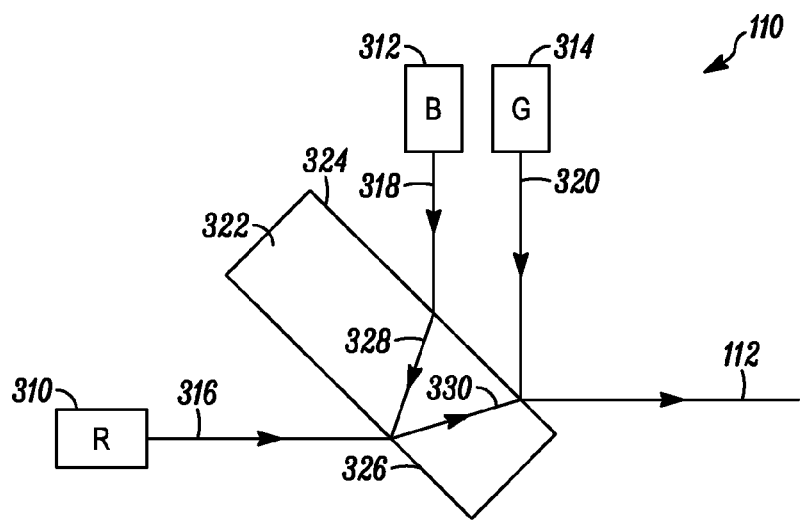
FIG. 3A is a diagram of a laser beam system having a dichroic optic capable of combining multiple laser beams.
Figure 3B:
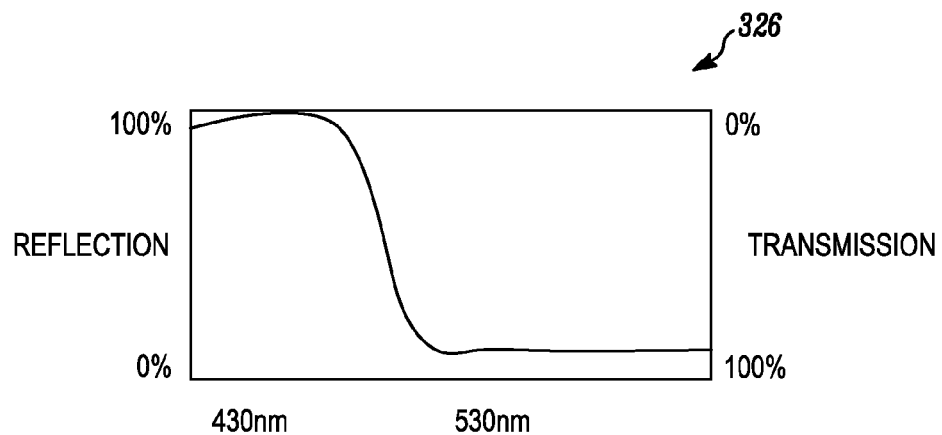
FIG. 3B and FIG. 3C are illustrations of the filter responses for the dichroic optic in accordance with one or more embodiments.
Figure 3C:
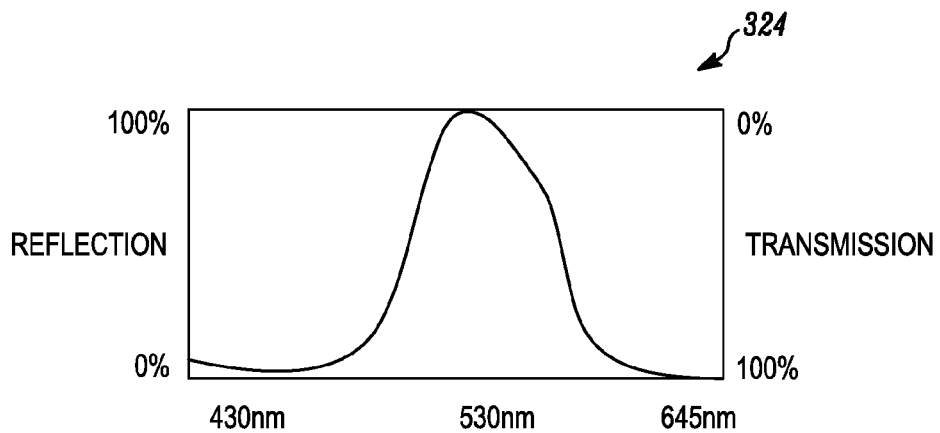
Figure 5A:
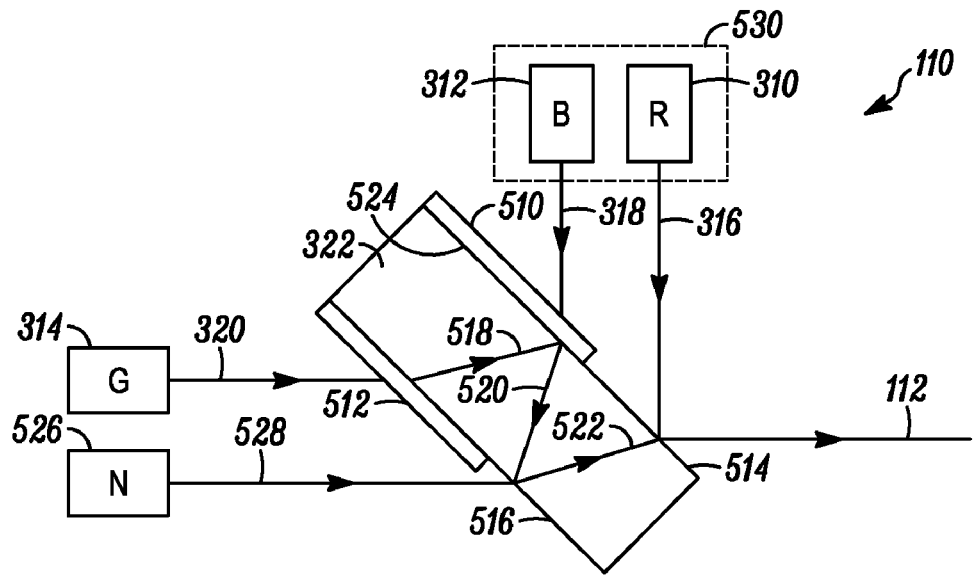
FIG. 5A is a diagram of a laser beam system having yet another dichroic optic capable of combining multiple laser beams.

Referring now to FIG. 3A, FIG. 3B, and FIG. 3C, a diagram of a laser beam system having a dichroic optic capable of combining multiple laser beams, and respective illustrations of the filter responses for the dichroic optic in accordance with one or more embodiments will be discussed. As shown in FIG. 3A, laser beam system 110 may comprise multiple lasers to emit multiple laser beams. For example, a red laser 310 may emit a red laser beam 316, a blue laser 312 may emit a blue laser beam 318, and a green laser 314 may emit a green laser beam 320. Such a combination of laser beams may be utilized as part of an RGB type color display such as scanned beam display 100 of FIG. 1, however other combinations of the number of lasers and/or the respective wavelengths of the lasers may be utilized, and the scope of the claimed subject matter is not limited in these respects. Although FIG. 3A depicts the laser sources as individual discrete sources, in one or more embodiments two or more of the laser sources may be provided in a single package. For example, red laser 310 and blue laser 312 may be combined in a single common package. One example of such a common package is shown in FIG. 5A, below. However, this is merely one example of how the laser sources may be individual devices and/or two or more laser sources may be combined in a single common package, and the scope of the claimed subject matter is not limited in this respect. Furthermore, although FIG. 3A is discussed herein with respect to scanned beam display 100 of FIG. 1 and its respective components, the embodiment shown in FIG. 3A may be adapted to other various types of projectors, for example but not limited to digital light projectors (DLP), liquid crystal on silicon (LCOS) projectors, laser based non-scanning projectors, and so on, and the scope of the claimed subject matter is not limited in this respect.

A dichroic optic 322 may be utilized to combine one or more of the beams emitted from the respective laser sources to arrive at an output beam 112 that includes the wavelengths of the emitted laser beams into a combined output beam. As such, output beam 112 may referred to as a white output beam since output beam may comprise the white color spectrum of visible light from the respective red laser beam 316, blue laser beam 318 and/or green laser beam 320, for example to display an image projected by scanned beam display 100. However, in one or more alternative embodiments, other colors of lasers may be utilized including invisible wavelengths such as infrared or ultraviolet wavelengths, and the scope of the claimed subject matter is not limited in this respect. Likewise, output beam 112 may comprise one or more specific wavelengths at any given instantaneous time due to the control of red laser 310, blue laser 312, and/or green laser 314 via controller 122 of FIG. 1 depending on the content of particular video signal being displayed by scanned beam display 100 such that output beam 112 is not necessarily a white beam at any given instant, and the scope of the claimed subject matter is not limited in this respect.

In one or more embodiments, dichroic optic 322 comprises a monolithic device having one or more optical filters for combining the laser beams into a single output beam 112. Dichroic optic 322 may have a first side and a second side, with either or both sides having an optic filter as described below. Dichroic optic 322 also has a thickness, which is between first and second sides. In an embodiment, light beams enter, exit and reflect from dichroic optic 322 only from at least one of the first side or the second side. In an embodiment, prior to incidence on dichroic optic 322, each of the light beams are non-collinear with other. Although FIG. 3A shows one particular exit angle of output beam 112 with respect to the surface of dichroic optic 322 from which output beam 112 exits, output beam 112 may exit at any selected angle, for example 45 degrees, 60 degrees, 30 degrees, 55 degrees and so on, in accordance with the particular design of scanned beam display 100, and the scope of the claimed subject matter is not limited in this respect.

In such embodiments, the red laser beam 316 emitted from red laser 310 enters dichroic optic 322 and is allowed to pass through filter 326 in which the response of filter 326 is selected to allow red light to pass there through. The red laser beam 316 passes through as part of internal beam 330 at a first offset angle from the plane of dichroic optic 322 corresponding to filter 326. Likewise, the red content of internal beam 330 passes through filter 324 corresponding to a surface of dichroic optic 322 opposite to filter 326. The response of filter 324 is selected such that the red content of internal beam 330 is allowed to pass there through and exit dichroic optic 322 as part of output beam 112. The blue laser beam 318 emitted by blue laser 312 is allowed enter dichroic optic 322 by passing through filter 324 wherein the response of filter 324 is such that a blue wavelength beam 318 is allowed to pass there through. The blue laser beam 318 passes through dichroic optic 322 as internal beam 328 at an offset. The internal beam 328 contains blue wavelength light that impinges on the opposite internal surface of dichroic optic 322 corresponding to filter 326. The response of filter 326 is selected such that the blue wavelength light of internal beam 328 is not allowed to pass there through, so that internal beam 328 is reflected and combined with red laser beam 316 as internal beam 330. As a result, internal beam 330 includes both red and blue wavelengths. As with the red wavelength content of internal beam 330, the blue wavelength content of internal beam 330 is also allowed to pass through filter 324 as part of output beam 112. As described, red laser beam 316 and blue laser beam 318 are combined into the content of output beam 112.

To add the content of green laser beam 320 to output beam 112, green laser beam 320 impinges on the surface of dichroic optic 322 corresponding to filter 324. The response of filter 324 is such that green light is not allowed to pass there through which results in green laser beam 320 being reflected off of dichroic optic 322 as part of the content of output beam 112. In one or more embodiments, the angles of incidence, reflection, and offset transmission of the red beam 316, blue beam 318, and green beam 320 are combined to be coincident, or sufficiently coincident, at output beam 112. In particular, the offset angle of blue beam 318 as it passes through filter 324 and the angle of internal reflection of the blue beam as internal beam 328 and internal beam 330 are selected in combination with the offset angle of red laser beam 316 as internal beam 330 may be selected such that the red beam 316 and the blue beam 318 are coincident and collinear within dichroic optic 322 and at output beam 112. Furthermore, the responses of filter 324 and filter 326 are selected to control the transmission and/or reflection of the beams at selected locations to allow the red laser beam 316, blue laser beam 318, and/or green laser beam 320 to arrive at in the combining of the beams at output beam 112.

The response of filter 326 is shown at FIG. 3B in which percent reflection and percent transmission are plotted versus wavelength. In the response of filter 326 as shown in FIG. 3B, red laser beam 316 having a wavelength of about 650 nanometers (nm) is allowed to pass through filter 326. Blue laser beam 318 having a wavelength of about 475 nm is not allowed to pass through filter 326 and as a result is reflected off filter 326 wherein internal beam 328 is reflected as internal beam 330. Likewise, the response of filter 324 is shown at FIG. 3C in which percent reflection and percent transmission are plotted versus wavelength. In the response of filter 324, red laser beam 316 having a wavelength of about 650 nm and blue laser beam having a wavelength of about 475 nm are allowed to pass through filter 324, which is illustrated as beam 318 passing through filter 324 as internal beam 328, and as internal beam 330 comprising red and blue light exiting dichroic optic 322 through filter 324. However, green laser beam 320 having a wavelength of about 510 nm is not allowed to pass through filter 324 and is reflected off of filter 324 to part of output beam 112. Thus, the combination of filtering by filter 324 and filter 326, and the angles of incidence, offset, and/or reflection of laser beams 316, 318, and 320 to combine in a coincident or nearly coincident manner as output beam 112. An alternative arrangement of the filters of dichroic optic 322 and the laser beams are shown in and described with respect to FIG. 4A, below.

Figure 4A:
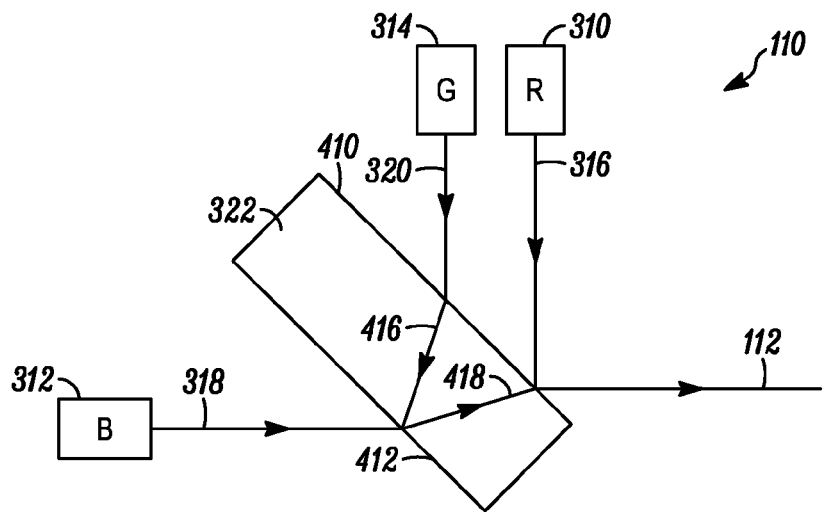
FIG. 4A is a diagram of a laser beam system having another dichroic optic capable of combining multiple laser beams.
Figure 4B:
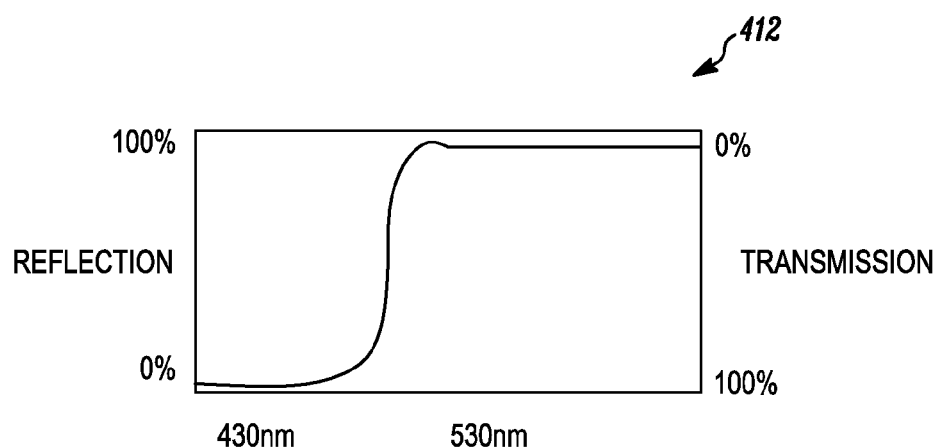
FIG. 4B and FIG. 4C are illustrations of the filter responses for the dichroic optic in accordance with one or more embodiments.
Figure 4C:
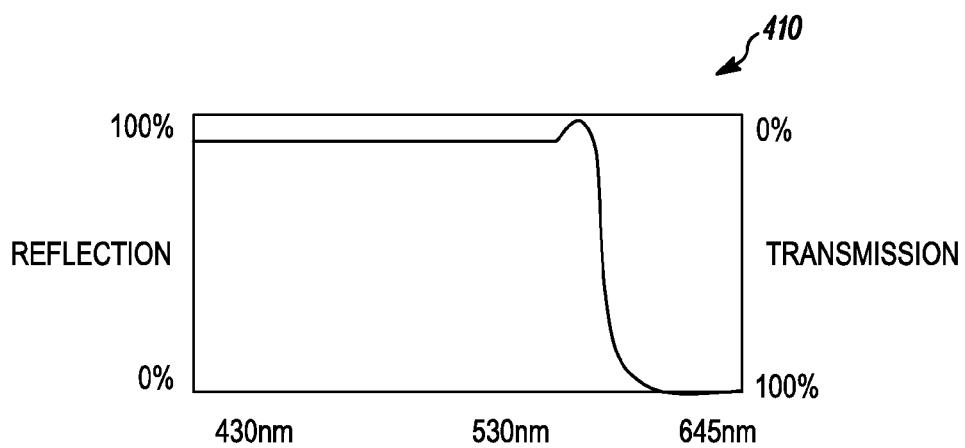

Referring now to FIG. 4A, FIG. 4B, and FIG. 4C, a diagram of a laser beam system having another dichroic optic capable of combining multiple laser beams, and respective illustrations of the filter responses for the dichroic optic in accordance with one or more embodiments will be discussed. The laser beam system 110 as shown in FIG. 4A is substantially similar to laser beam system 110 of FIG. 3A except that the blue laser 312, green laser 314, and red laser 310 are disposed in an alternative arrangement such that blue laser beam 318, green laser beam 320, and red laser beam 316 impinge on dichroic optic 322 on different sides thereof. Although FIG. 4A depicts the laser sources as individual discrete sources, in one or more embodiments two or more of the laser sources may be provided in a single package. For example, red laser 310 and blue laser 312 may be combined in a single common package. One example of such a common package is shown in FIG. 5A, below. However, this is merely one example of how the laser sources may be individual devices and/or two or more laser sources may be combined in a single common package, and the scope of the claimed subject matter is not limited in this respect. Furthermore, although FIG. 4A is discussed herein with respect to scanned beam display 100 of FIG. 1 and its respective components, the embodiment shown in FIG. 4A may be adapted to other various types of projectors, for example but not limited to digital light projectors (DLP), liquid crystal on silicon (LCOS) projectors, laser based non-scanning projectors, and so on, and the scope of the claimed subject matter is not limited in this respect.

In the arrangement shown in FIG. 4A, blue laser beam 318 passes through filter 412 and filter 410 at an offset due to refraction to contribute to output beam 112. Green laser beam 320 passes through filter 410 as an offset internal beam 416 which is in turn reflected by filter 412 to combine with blue laser beam 318 as internal beam 418 to also exit through filter 410 as part of output beam 112. Red laser beam 316 is reflected off filter 410 to contribute to output beam 112. Although FIG. 4A shows one particular exit angle of output beam 112 with respect to the surface of dichroic optic 322 from which output beam 112 exits, output beam 112 may exit at any selected angle, for example 45 degrees, 60 degrees, 30 degrees, 55 degrees and so on, in accordance with the particular design of scanned beam display 100, and the scope of the claimed subject matter is not limited in this respect.

In one or more embodiments, filter 412 has the response shown in FIG. 4B such that red laser beam 318 having a wavelength of about 650 nm is allowed to pass there through, whereas green laser beam 320 having a wavelength of about 510 nm as internal beam 416 is reflected off filter 412 to be combined with the green laser beam 320 as internal beam 418. Filter 410 has the response as shown in FIG. 4C in which blue laser beam having a wavelength of about 475 nm and green laser beam 320 having a wavelength of about 510 nm, in combination as internal beam 418, are allowed to pass through filter 410. Red laser beam 316 having a wavelength of about 650 nm is not allowed to pass through filter 410 and is therefore reflected off filter 410 to combine be collinear, or nearly collinear, with blue laser beam 312 and/or green laser beam 320 at output beam 112. It should be noted that the arrangement of beams and filters of dichroic optic 322 of FIG. 4A is merely another embodiment of several possible embodiments, and the scope of the claimed subject matter is not limited in these respects. A further arrangement of laser beams and filters of dichroic optic 322 is shown in and described with respect to FIG. 5A, below.

Referring now to FIG. 5A, FIG. 5B, FIG. 5C, and FIG. 5D, a diagram of a laser beam system having yet another dichroic optic capable of combining multiple laser beams, and respective illustrations of the filter responses for the dichroic optic in accordance with one or more embodiments will be discussed. The laser beam system 110 as shown in FIG. 5A is substantially similar to laser beam systems 110 of FIG. 3A and/or FIG. 4A, except that the blue laser 312, green laser 314, and red laser 310 are disposed in an alternative arrangement such that blue laser beam 318, green laser beam 320, and red laser beam 316 impinge on dichroic optic 322 on different sides thereof, with some additional differences. Although FIG. 5A depicts the laser sources as individual discrete sources, in one or more embodiments two or more of the laser sources may be provided in a single package. For example, red laser 310 and blue laser 312 optionally may be combined in a single common package 530 in one or more embodiments. However, this is merely one example of how the laser sources may be individual devices and/or two or more laser sources may be combined in a single common package, and the scope of the claimed subject matter is not limited in this respect. Furthermore, although FIG. 5A is discussed herein with respect to scanned beam display 100 of FIG. 1 and its respective components, the embodiment shown in FIG. 5A may be adapted to other various types of projectors, for example but not limited to digital light projectors (DLP), liquid crystal on silicon (LCOS) projectors, laser based non-scanning projectors, and so on, and the scope of the claimed subject matter is not limited in this respect.

As shown in FIG. 5A, green laser beam 320 is directed toward dichroic optic 322 and passes through element 512 which may have an index of refraction matched or nearly matched with the index of refraction of dichroic optic 322 to minimize or reduce or otherwise avoid reflections of green laser beam 320 off dichroic optic 322. Green laser beam 320 enters into dichroic optic 322 at an offset as internal beam 518, which in turn reflects off filter 524 as internal beam 520. Internal beam 520 is reflected off filter 516 as internal beam 522, which in turn is transmitted through filter 514 to contribute to output beam 112. Although FIG. 5A shows one particular exit angle of output beam 112 with respect to the surface of dichroic optic 322 from which output beam 112 exits, output beam 112 may exit at any selected angle, for example 45 degrees, 60 degrees, 30 degrees, 55 degrees and so on, in accordance with the particular design of scanned beam display 100, and the scope of the claimed subject matter is not limited in this respect. Blue laser beam 318 passes through element 510, which like element 512, may have an index of refraction matched or nearly matched with the index of refraction of dichroic optic 322 to minimize or reduce or otherwise avoid reflections of blue laser beam 318 off dichroic optic 322. Blue laser beam 318 is allowed to pass through filter 524 to be combined with green laser beam 320 as internal beam 520. The green wavelength content of internal beam is reflected off filter 516 as internal beam 52, which in turn passes through filter 514 to contribute to output beam 112. Red laser beam 316 reflects off filter 514 to contribute to output beam 112.

Figure 5B:
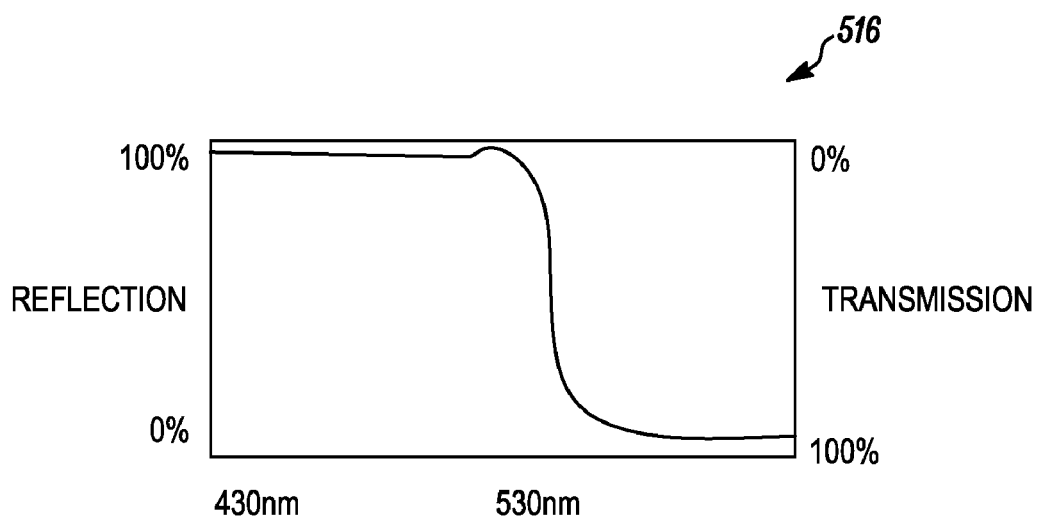
FIG. 5B, FIG. 5C, and FIG. 5D are illustrations of the filter responses for the dichroic optic in accordance with one or more embodiments.
Figure 5C:
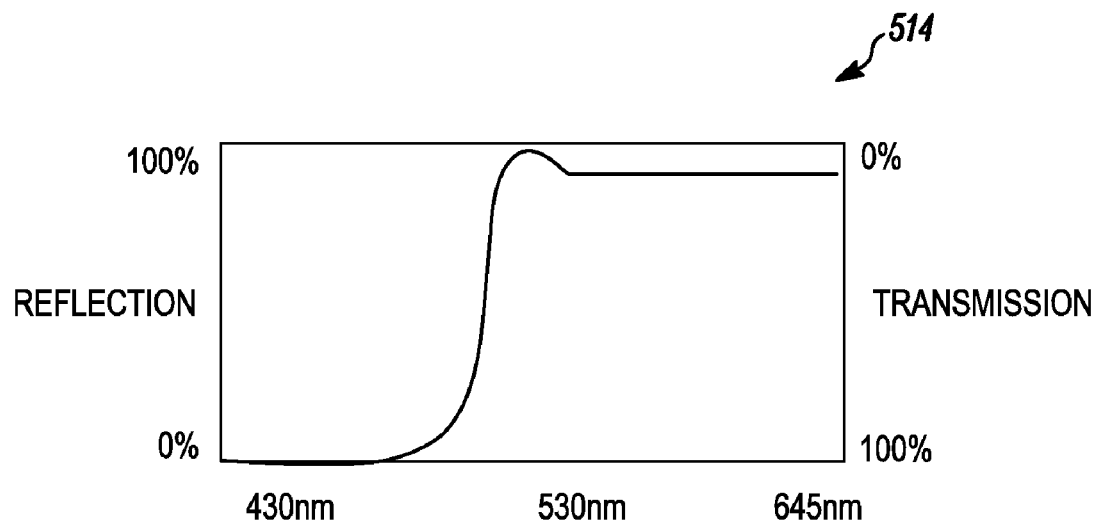
Figure 5D:
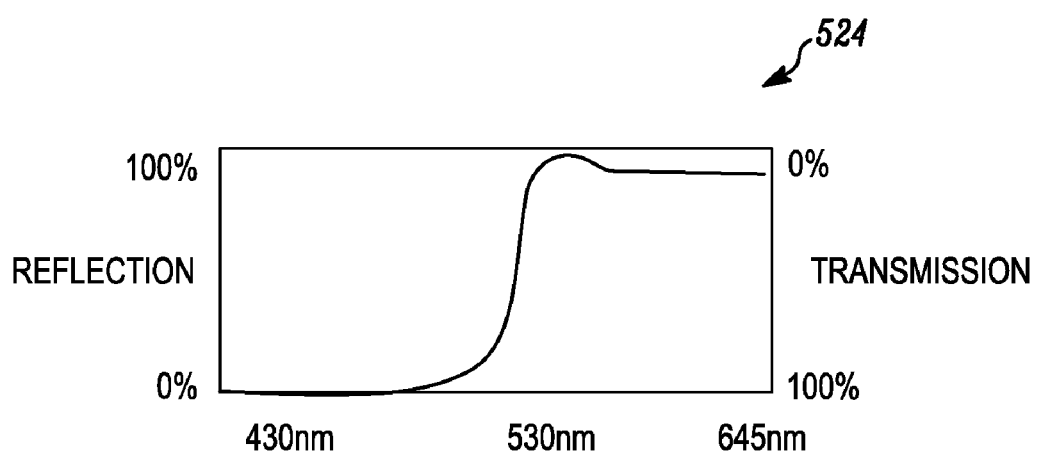

The response of filter 516 is shown in FIG. 5B. Filter 516 reflects the green wavelength content of internal beam 520 having a wavelength of about 510 nm, and also reflects the blue wavelength content of internal beam 520 having a wavelength of about 475 nm. The response of filter 514 is shown at FIG. 5C. Filter 514 transmits the green wavelength content of internal beam 522 having a wavelength of about 510 nm, and also transmits the blue wavelength content of internal beam 522 having a wavelength of about 475 nm. Filter 514 reflects red laser beam 316 having a wavelength of about 650 nm. Likewise, the response of filter 524 is shown at FIG. 5D. Filter 524 reflects the green wavelength content of internal beam 518 having a wavelength of about 510 nm, while filter 524 transmits blue laser beam 318 having a wavelength of about 475 nm there through. The combination of the wavelengths and angles of incidence of the laser beams in combination with the filters of dichroic filter 322 as shown in FIG. 5A is yet one other arrangement of multiple various arrangements, and the scope of the claimed subject matter is not limited in these respects. The laser beams are arranged at an angle of incidence such that the beams are combined to be collinear, or at least sufficiently collinear, for a given application of scanned beam display in accordance with one or more embodiments.

In one or more embodiments, laser beam system 110 may comprise four or more laser sources, up to N number of laser sources combined via dichroic optic 322. For example, laser beam 110 may comprise a fourth laser source (N) 526 having a fourth color laser beam 528. Laser beam 528 may impinge on dichroic optic 322 at filter 516 to enter dichroic optic 322 at an offset such that laser beam 528 combines with internal beam 520 to arrive at internal beam 522. Internal beam 522 may exit dichroic optic 322 at filter 514 such that beam 528 contributes as a component of output beam 112. Thus, in one or more embodiments, four or more laser beams from four or more laser sources may be combined via dichroic optic 322 such that the beams combine in a collinear, or nearly collinear, manner at output beam 112. In one or more alternative embodiments, two or more of the laser beams may be combined via dichroic optic 322 in a manner that is at least partially not collinear, for example as shown in and described with respect to FIG. 6, below.

Figure 6:
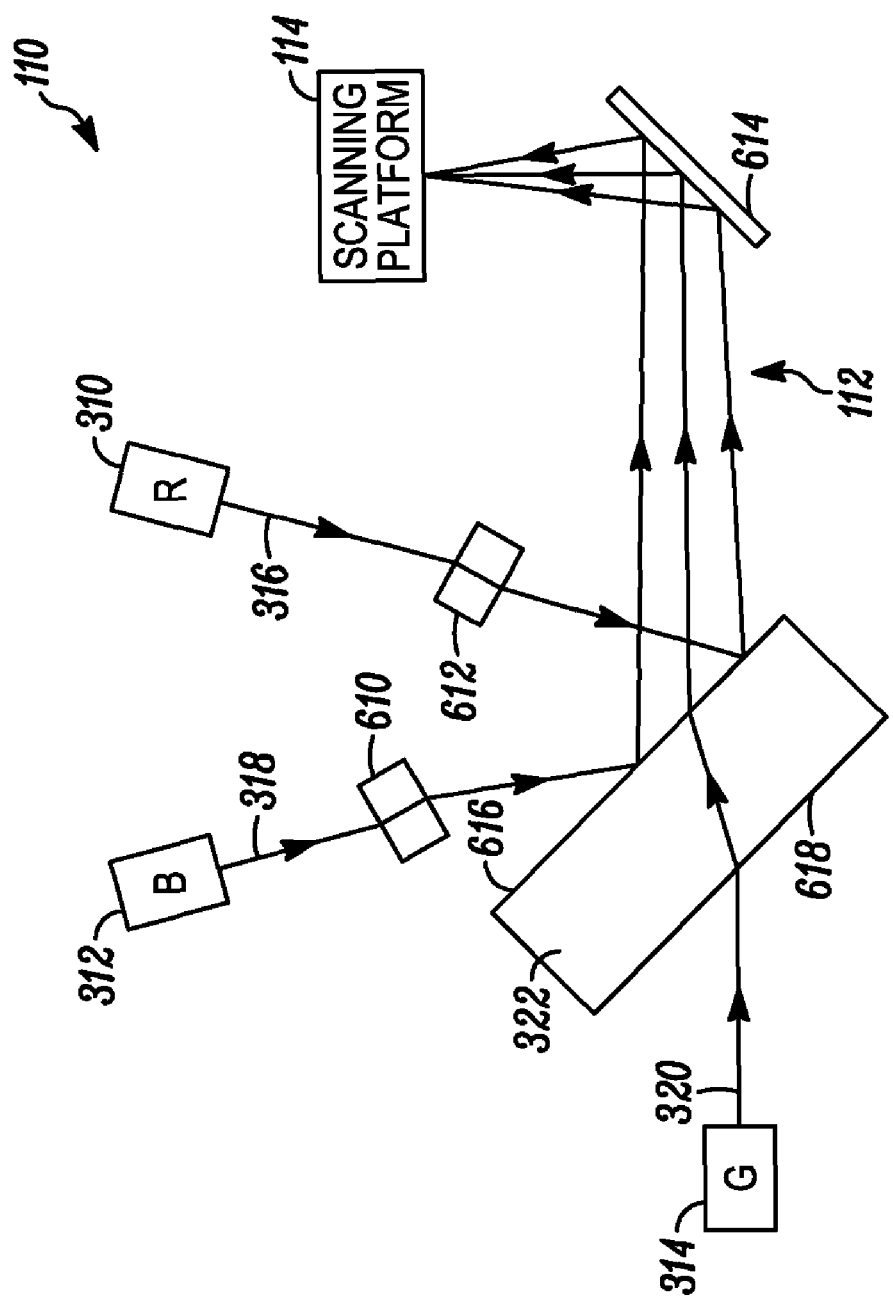
FIG. 6 is a diagram of a laser beam system having a dichroic optic in which one or more laser beams impinge on the dichroic optic at an offset in accordance with one or more embodiments.

Referring now to FIG. 6, a diagram of a laser beam system having a dichroic optic in which one or more laser beams impinge on the dichroic optic at an offset in accordance with one or more embodiments will be discussed. In general, laser beam system 110 of FIG. 6 may share many similarities with the laser beam systems 110 of FIG. 3A, FIG. 4A, and/or FIG. 5A, except that at least some of the laser beams may be combined in a manner that is at least partially not collinear with one or more other laser beams. For example, as shown in FIG. 6, green laser beam 320 may pass through filter 618 of dichroic optic 322 at an offset, and may exit filter 616 of dichroic optic 322 to contribute to output beam 112. Although FIG. 6 shows one particular exit angle of output beam 112 with respect to the surface of dichroic optic 322 from which output beam 112 exits, output beam 112 may exit at any selected angle, for example 45 degrees, 60 degrees, 30 degrees, 55 degrees and so on, in accordance with the particular design of scanned beam display 100, and the scope of the claimed subject matter is not limited in this respect. Blue laser beam 318 may pass through element 610 to impinge on dichroic optic 322 at a first offset angle. Likewise, red laser beam 316 may pass through element 612 to impinge on dichroic optic 322 at a second offset angle. Blue laser beam 318 and/or red laser beam 316 may reflect off filter 616 of dichroic optic 322 such that blue laser beam 318 combines at output beam 112 at an offset from the green laser beam 320 portion of output beam, and/or such that red laser beam 316 combines at output beam 112 at an offset from the green laser beam 320 portion and/or the blue laser beam 318 portion of output beam 112. Although FIG. 6 depicts the laser sources as individual discrete sources, in one or more embodiments two or more of the laser sources may be provided in a single package. For example, red laser 310 and blue laser 312 may be combined in a single common package. However, this is merely one example of how the laser sources may be individual devices and/or two or more laser sources may be combined in a single common package, and the scope of the claimed subject matter is not limited in this respect. Furthermore, although FIG. 6 is discussed herein with respect to scanned beam display 100 of FIG. 1 and its respective components, the embodiment shown in FIG. 6 may be adapted to other various types of projectors, for example but not limited to digital light projectors (DLP), liquid crystal on silicon (LCOS) projectors, laser based non-scanning projectors, and so on, and the scope of the claimed subject matter is not limited in this respect.

The offset laser beams of output beam 112 may be reflected off reflector 614 toward scanning platform 114 for scanning purposes. The responses of filter 616 and filter 618 may be selected to allow transmission and/or reflection of the respective beams accordingly. The offset or offsets of the laser beams may result in the combining of the laser beams in an at least partially non-collinear manner in one or more embodiments. It should be known that although one particular arrangement the laser beams at an offset is shown in FIG. 6, other various arrangements of the laser beams to be combined in an at least partially non-collinear manner may likewise be provided, and the scope of the claimed subject matter is not limited in this respect. For example, although FIG. 6 shows blue laser 312 and red laser 310 each having a respective optical element 610 and 612, respectively, to provide at least some separation of the blue laser beam 318 and red laser beam 316, the laser sources may further include additional optical elements, such as two or more optical elements for one or more of the respective laser sources, in order to provide additional beam separation. Likewise, green laser 314 may also have one or more of its own respective optical elements to provide separation of the beams as desired, and the scope of the claimed subject matter is not limited in this respect.

Figure 7:
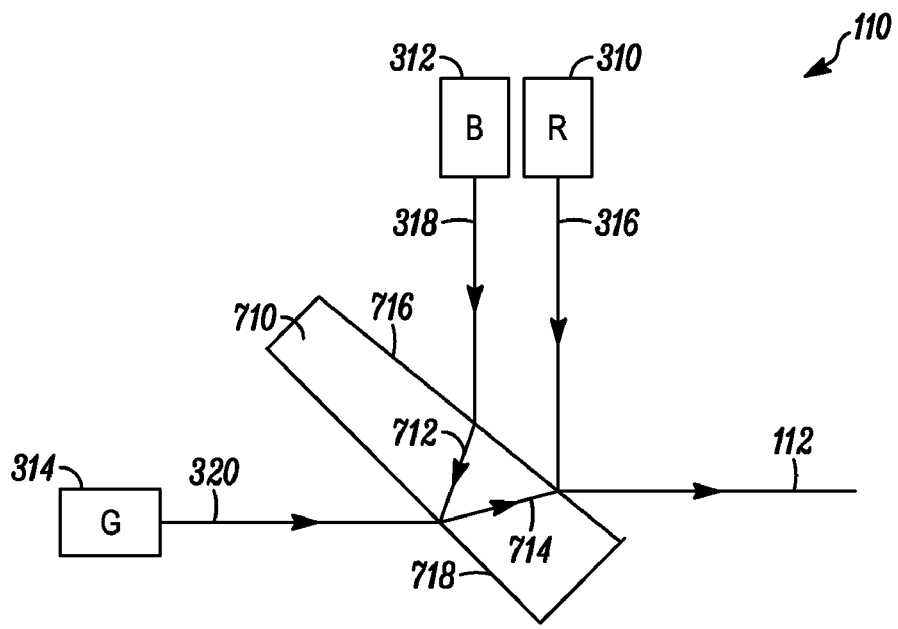
FIG. 7 is a diagram of a laser beam system having a wedge shaped dichroic optic capable of combining multiple laser beams in accordance with one or more embodiments.

Referring now to FIG. 7, a diagram of a laser beam system having a wedge shaped dichroic optic in accordance with one or more embodiments will be discussed. The arrangement of laser beam system 110 of FIG. 7 is substantially similar to the laser beam systems 110 of FIG. 3A, FIG. 4A, and/or FIG. 5A, as discussed above, except that dichroic optic 710 of FIG. 7 comprises a generally wedge shape rather than the generally rectilinear shape of dichroic optic 322 as shown in and described with respect to FIG. 3A, FIG. 4A, and/or FIG. 5A. In one or more embodiments, a wedge shaped optic such as dichroic optic 712 may be utilized to provide adjustment of the ultimate image projected by scanned beam display 100, for example to provide reduction and/or correction to smile distortion in the projected image, although the scope of the claimed subject matter is not limited in this respect.

As shown in FIG. 7, green laser beam 320 may be transmitted through filter 718 at an offset as internal beam 714 to exit dichroic optic 712 through filter 716 to contribute to output beam 112. Although FIG. 7 shows one particular exit angle of output beam 112 with respect to the surface of dichroic optic 710 from which output beam 112 exits, output beam 112 may exit at any selected angle, for example 45 degrees, 60 degrees, 30 degrees, 55 degrees and so on, in accordance with the particular design of scanned beam display 100, and the scope of the claimed subject matter is not limited in this respect. Blue laser beam 318 may pass through filter 716 to enter dichroic optic 710 at an offset as internal beam 712. Internal beam 712 may then reflect off filter 718 to combine with green laser beam 320 as internal beam 714, which in turn exits dichroic optic 710 by being transmitted through filter 716 as output beam 112. Red laser beam 316 may be reflected off dichroic optic 710 by being reflected by filter 716 to combine at output beam 112. Although FIG. 7 depicts the laser sources as individual discrete sources, in one or more embodiments two or more of the laser sources may be provided in a single package. For example, red laser 310 and blue laser 312 may be combined in a single common package. However, this is merely one example of how the laser sources may be individual devices and/or two or more laser sources may be combined in a single common package, and the scope of the claimed subject matter is not limited in this respect. Furthermore, although FIG. 7 is discussed herein with respect to scanned beam display 100 of FIG. 1 and its respective components, the embodiment shown in FIG. 7 may be adapted to other various types of projectors, for example but not limited to digital light projectors (DLP), liquid crystal on silicon (LCOS) projectors, laser based non-scanning projectors, and so on, and the scope of the claimed subject matter is not limited in this respect.

The responses of filter 718 and filter 716 may be selected to have the appropriate transmission and/or reflection properties and the respective wavelengths for the laser beams as discussed herein. Furthermore, the angles of incidence, refraction, and/or reflection may be selected to provide the appropriate amount of collinear or non-collinear combining depending on the particular application of scanned beam display 100, and/or further by talking into account the angle between the non-parallel sides of the wedge shaped dichroic optic 710. In addition, the filter response of the various filters shown and described herein may be realized via different types of filters, for example optical filter coatings, diffractive optical elements, wavelength sensitive gratings, and/or electrically controllable optical filter elements, and the scope of the claimed subject matter is not limited in this respect. In one or more embodiments, dichroic optic 322 and/or dichroic optic 710 may be fabricated as a single, monolithic element to provide less tolerance sensitivity than if the filtering functions were obtained via multiple discrete dichroic elements, either separately disposed and/or combined into a multiunit structure, although the scope of the claimed subject matter is not limited in this respect. In one or more embodiments, the various laser beam systems 110 dichroic elements may be disposed as a scanned beam display 100 in a standalone type projector and/or may be utilized as part of a display of an information handling system as shown in and described with respect to FIG. 9, below.

Figure 8A:
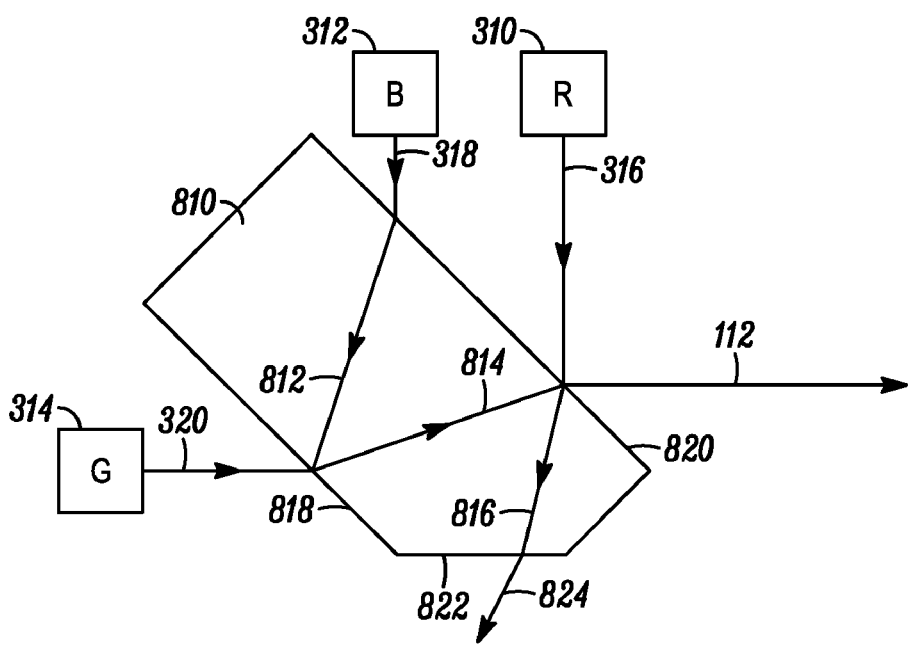
FIG. 8A is a diagram of a laser beam system having a dichroic optic with a beam pickoff capable of combining multiple laser beams.
Figure 8B:
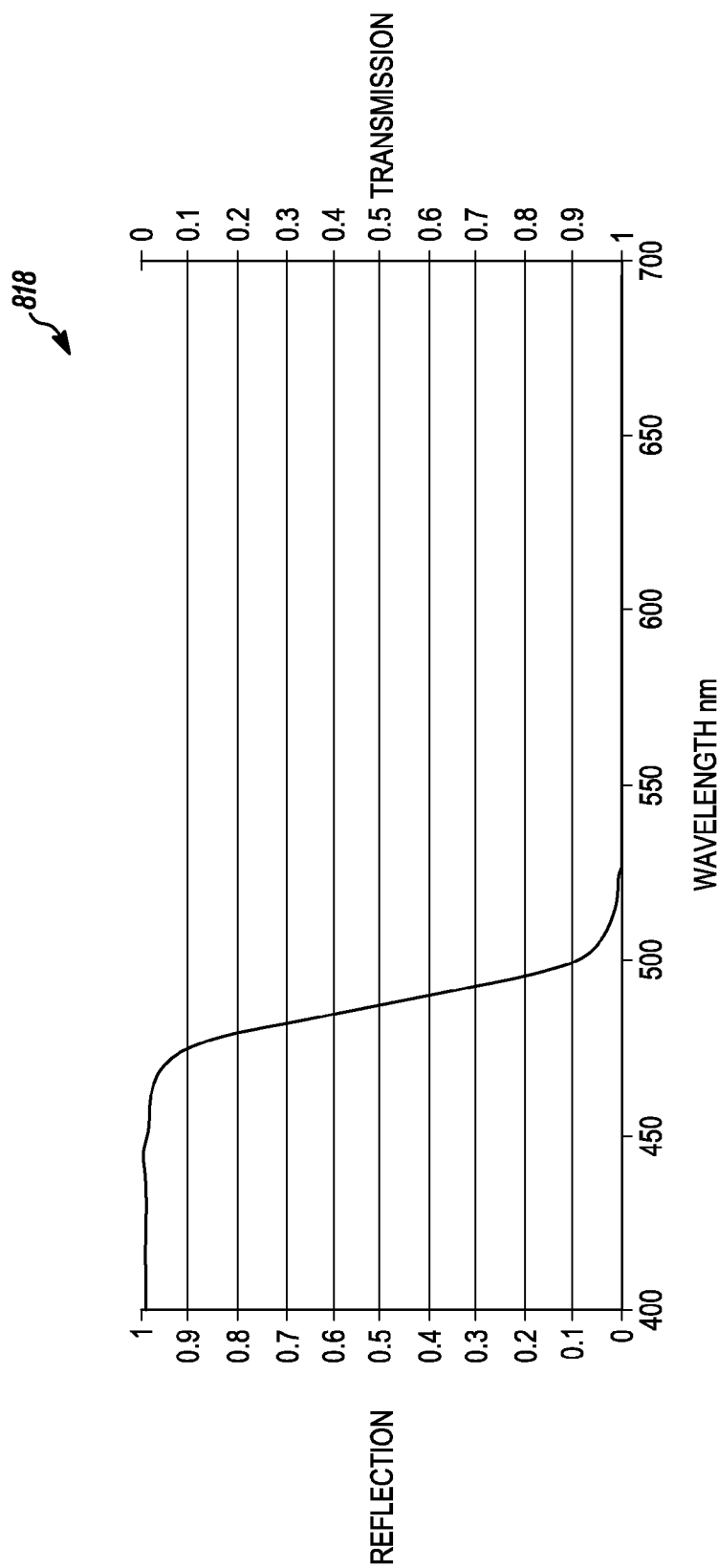
FIG. 8B and FIG. 8C are illustrations of the filter responses for the dichroic optic in one or more embodiments.
Figure 8C:
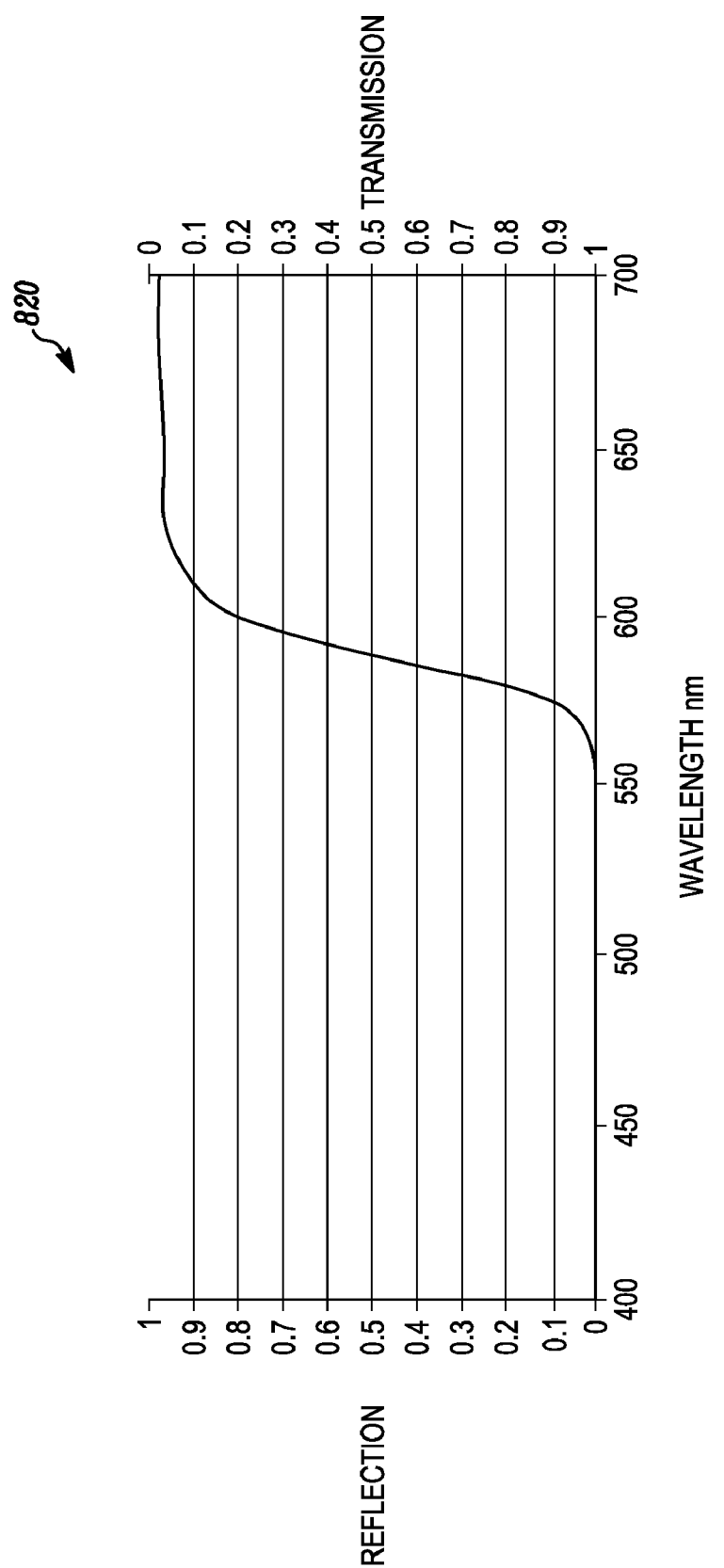

Referring now to FIG. 8A, FIG. 8B and FIG. 8C, a diagram of a laser beam system having a dichroic optic with a beam pickoff capable of combining multiple laser beams and illustrations of the filter responses for the dichroic optic in one or more embodiments will be discussed. The arrangement of laser beam system 110 of FIG. 8A is substantially similar to the laser beam systems 110 of FIG. 3A, FIG. 4A, and/or FIG. 5A as discussed above, except that dichroic optic 810 of FIG. 8A includes a beam pickoff coating 822. Although FIG. 8A depicts the laser sources as individual discrete sources, in one or more embodiments two or more of the laser sources may be provided in a single package. For example, red laser 310 and blue laser 312 may be combined in a single common package. However, this is merely one example of how the laser sources may be individual devices and/or two or more laser sources may be combined in a single common package, and the scope of the claimed subject matter is not limited in this respect. Furthermore, although FIG. 8A is discussed herein with respect to scanned beam display 100 of FIG. 1 and its respective components, the embodiment shown in FIG. 8A may be adapted to other various types of projectors, for example but not limited to digital light projectors (DLP), liquid crystal on silicon (LCOS) projectors, laser based non-scanning projectors, and so on, and the scope of the claimed subject matter is not limited in this respect.

As shown in FIG. 8A, green laser 314 emits a green laser beam 320, blue laser 312 emits a blue laser beam 318, and red laser 310 emits a red laser beam 316. In a similar manner as discussed herein, above, with respect to FIG. 3A, FIG. 4A, and/or FIG. 5A, green laser beam 320 enters dichroic optic 810 by passing through filter 818 having a response as shown in FIG. 8B which allows green laser beam 320 to pass there through at an offset as a component of internal beam 814. Similarly, blue laser beam 318 enters dichroic optic 810 at an offset as internal beam 812 by being transmitted through filter 820 having a response as shown in FIG. 8C. Internal beam 812 comprising the blue wavelength of blue laser beam 318 is not transmitted through filter 818 and is instead reflected as a component of internal beam 814. Again, the angle of incidence, refraction, and reflection of blue laser beam 318 and internal beam 812 selected to be coincident, or nearly coincident, with the angle of incidence and refraction of green laser beam 320 and internal beam 814 such that the green laser beam component and blue laser beam component of internal beam are coincident, or sufficiently coincident and collinear as internal beam 814. Internal beam 814 exits dichroic optic 810 by being transmitted through filter 820 at an offset to provide the green and blue wavelength components of output beam 112. Although FIG. 8 shows one particular exit angle of output beam 112 with respect to the surface of dichroic optic 810 from which output beam 112 exits, output beam 112 may exit at any selected angle, for example 45 degrees, 60 degrees, 30 degrees, 55 degrees and so on, in accordance with the particular design of scanned beam display 100, and the scope of the claimed subject matter is not limited in this respect.

In one or more embodiments, red laser beam 316 of red laser 310 impinges on dichroic optic 810 at an angle such that at least a portion of red laser beam is reflected by filter 820 to provide a red wavelength component of output beam 112. Alternatively, the response of filter 820 may be selected such that at least a portion of red laser beam is transmitted there through and enters dichroic optic 810 as a red wavelength component of internal beam 816. Likewise, in such alternative embodiments, the green and blue wavelength components of internal beam 814 may be reflected off filter 820 and contribute green and blue wavelength components to internal beam 816. Internal beam 816 may then exit dichroic optic 810 through anti-reflective (AR) coating 824 as an alternative output beam 824, or pickoff beam. In one or more embodiments, any of the dichroic optics discussed herein for beam combining may be utilized in a scanned beam display or similar display that is incorporated into an information handling system such as that shown in and described with respect to FIG. 9, below.

Figure 9:
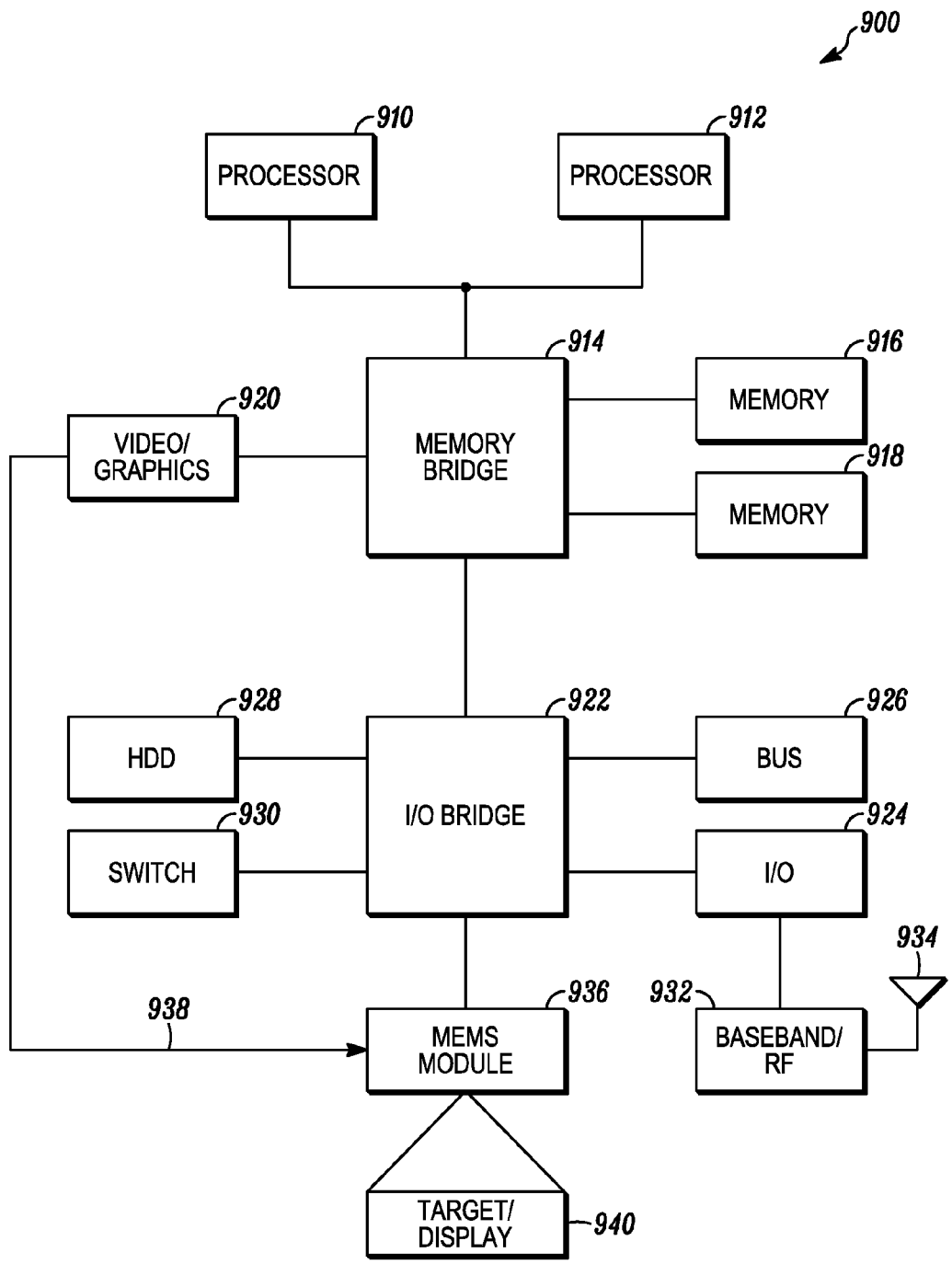
FIG. 9 is a diagram of an information handling system utilizing a scanned beam display in accordance with one or more embodiments.

Referring now to FIG. 9, a diagram of an information handling system utilizing a scanned beam display in accordance with one or more embodiments will be discussed. Information handling system 900 of FIG. 9 may tangibly embody scanned beam display 100 as shown in and described with respect to the various figures herein. Although information handling system 900 represents one example of several types of computing platforms, including cell phones, personal digital assistants (PDAs), netbooks, notebooks, internet browsing devices, and so on, information handling system 900 may include more or fewer elements and/or different arrangements of the elements than shown in FIG. 9, and the scope of the claimed subject matter is not limited in these respects.

Information handling system 900 may comprise one or more processors such as processor 910 and/or processor 912, which may comprise one or more processing cores. One or more of processor 910 and/or processor 912 (or alternatively one or more cores of a one or more processors) may couple to one or more memories 916 and/or 918 via memory bridge 914, which may be disposed external to processors 910 and/or 912, or alternatively at least partially disposed within one or more of processors 910 and/or 912. Memory 916 and/or memory 918 may comprise various types of semiconductor-based memory, for example volatile type memory and/or non-volatile type memory. Memory bridge 914 may couple to a video/graphics system 920 to drive a display device, which may comprise projector 936, coupled to information handling system 900. Projector 936 may comprise scanned beam display 100 as shown in and described with respect to the various figures herein. In one or more embodiments, video/graphics system 920 may couple to one or more of processors 910 and/or 912 and may be disposed on the same core as the processor 810 and/or 812, although the scope of the claimed subject matter is not limited in this respect.

Information handling system 900 may further comprise input/output (I/O) bridge 982 to couple to various types of I/O systems. I/O system 924 may comprise, for example, a universal serial bus (USB) type system, an IEEE 1394 type system, or the like, to couple one or more peripheral devices to information handling system 900. Bus system 926 may comprise one or more bus systems such as a peripheral component interconnect (PCI) express type bus or the like, to connect one or more peripheral devices to information handling system 900. A hard disk drive (HDD) controller system 928 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 930 may be utilized to couple one or more switched devices to I/O bridge 922, for example Gigabit Ethernet type devices or the like. Furthermore, as shown in FIG. 9, information handling system 900 may include a baseband and radio-frequency (RF) block 932 comprising a base band processor and/or RF circuits and devices for wireless communication with other wireless communication devices and/or via wireless networks via antenna 934, although the scope of the claimed subject matter is not limited in these respects.

In one or more embodiments, information handling system 900 may include a projector 936 that may correspond to scanning platform 114 of FIG. 1 and/or the various figures herein, and which may include any one or more or all of the components of scanned laser display 100 such as controller 122, horizontal drive circuit 118, vertical drive circuit 120, and/or laser source 110. In one or more embodiments, projector 936 may be controlled by one or more of processors 910 and/or 912 to implements some or all of the functions of controller 122 of FIG. 1. In one or more embodiments, projector 936 may comprise a MEMS based scanned laser display for displaying an image projected by projector 936 where the image may likewise be represented by target/display 940. In one or more embodiments, a scanned beam projector may comprise video/graphics block 920 having a video controller to provide video information 938 to projector 936 to display an image represented by target/display 940. In one or more embodiments, display projector 936 may be capable of utilizing a monolithic dichroic optic such as dichroic optic 322, dichroic optic 710 dichroic optic 810 to combine one or more beams of scanned beam display 100 as discussed herein. However, these are merely example implementations for projector 936 within information handling system 900, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to dichroic filter laser beam combining and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a dichroic optic having a first side, a second side opposite to the first side, and a third side nonparallel to the first side and nonparallel to the second side, wherein the second side has an optical filter, wherein each of a light beam having a first wavelength, a light beam having a second wavelength and a light beam having a third wavelength enter, exit or reflect from the dichroic optic from at least one of the first or second sides, and only exit from the third side, and wherein prior to incidence on the dichroic optic each of the light beams having the first, second or third wavelengths are non-collinear with each other;
wherein the light beam having the first wavelength and the light beam having the second wavelength are substantially collinear in a first internal beam within the dichroic optic;
wherein the optical filter has a response capable of transmitting a first portion of the light beam having the first wavelength and a first portion of the light beam having the second wavelength, while reflecting second portions of the light beams having the first and second wavelengths, and reflecting a first portion of the light beam having the third wavelength, while transmitting a second portion of the light beam having the third wavelength;
wherein the first portion of the light beam having the first wavelength, the first portion of the light beam having the second wavelength, and the first portion of the light beam having the third wavelength are combined in a substantially collinear manner while emanating from the dichroic optic at the optical filter; and
wherein the second portions of the light beams having first, second, and third wavelengths are substantially collinear in a second internal beam that exits the dichroic optic at the third side as a pickoff beam.

2. The apparatus of claim 1, further comprising the dichroic optic having a thickness, wherein a combination of an angle of incidence of the light beam having the first wavelength on the first side, the angle of incidence of the light beam having the second wavelength on the first and second side and the thickness operate to combine the light beam having the first wavelength and the light beam having the second wavelength in a substantially collinear manner within the dichroic optic.

3. The apparatus of claim 1, further comprising the first side having a first side optical filter, wherein the first side optical filter has a response capable of transmitting the light beam having the first wavelength and reflecting the light beam having the second wavelength.

4. An apparatus as claimed in claim 1, wherein the dichroic optic comprises a generally rectilinear shape, or a wedge shape, or combinations thereof.

5. An apparatus as claimed in claim 1, wherein the first side and the second side of the dichroic optic are substantially parallel.

6. An apparatus as claimed in claim 1, wherein the first side and the second side of the dichroic optic are non-parallel.

7. An apparatus as claimed in claim 1, wherein the dichroic optic comprises a monolithic structure.

8. The apparatus of claim 1, wherein the first light beam having the first wavelength enters the dichroic optic from the first side, wherein the light beam having the second wavelength enters the dichroic optic from the second side, and wherein the light beam having the third wavelength reflects off of the second side of the dichroic optic such that the light beam having the first wavelength, the light beam having the second wavelength, and the light beam having the third wavelength are combined in a substantially collinear manner.

9. The apparatus of claim 1, wherein the second side further comprises a second optical filter.

10. An information handling system, comprising:
- a processor and a memory coupled to the processor; and
- a scanned beam display coupled to the processor, the scanned beam display comprising:

at least one light source to generate a light beam having a first wavelength, a light beam having a second wavelength and a light beam having a third wavelength; and
- a dichroic optic having a first side, a second side opposite to the first side, and a third side nonparallel to the first side and nonparallel to the second side, wherein the second side has an optical filter, wherein each of the light beams having the first, second and third wavelength, enter, exit or reflect from the dichroic optic from at least one of the first or second sides, and only exit from the third side, and wherein prior to incidence on the dichroic optic each of the light beams having the first, second or third wavelengths are non-collinear with each other;
- wherein the light beam having the first wavelength and the light beam having the second wavelength are substantially collinear in a first internal beam within the dichroic optic;
- wherein the optical filter has a response capable of transmitting a first portion of the light beam having the first wavelength and a first portion of the light beam having the second wavelength, while reflecting second portions of the light beams having the first and second wavelengths, and reflecting a first portion of the light beam having the third wavelength, while transmitting a second portion of the light beam having the third wavelength;
- wherein the first portion of the light beam having the first wavelength, the first portion of the light beam having the second wavelength, and the first portion of the light beam having the third wavelength are combined in a substantially collinear manner while emanating from the dichroic optic at the optical filter; and
- wherein the second portions of the light beams having first, second, and third wavelengths are substantially collinear in a second internal beam that exits the dichroic optic at the third side as a pickoff beam.

11. The information handling system of claim 10, further comprising the dichroic optic having a thickness, wherein a combination of an angle of incidence of the light beam having the first wavelength on the first side, the angle of incidence of the light beam having the second wavelength on the first and second side and the thickness operate to combine the light beam having the first wavelength and the light beam having the second wavelength in a substantially collinear manner within the dichroic optic.

12. The information handling system of claim 10, further comprising the first side having a first side optical filter, wherein the first side optical filter has a response capable of transmitting the light beam having the first wavelength and reflecting the light beam having the second wavelength.

13. An information handling system as claimed in claim 10, wherein the dichroic optic comprises a generally rectilinear shape, or a wedge shape, or combinations thereof 14. An information handling system as claimed in claim 10, wherein the first side and the second side of the dichroic optic are substantially parallel.

15. An information handling system as claimed in claim 10, wherein the first side and the second side of the dichroic optic are non-parallel.

16. An information handling system as claimed in claim 10, wherein the dichroic optic comprises a monolithic structure.

17. The information handling system of claim 10, wherein the first light beam having the first wavelength enters the dichroic optic from the first side, wherein the light beam having the second wavelength enters the dichroic optic from the second side, and wherein the light beam having the third wavelength reflects off of the second side of the dichroic optic such that the light beam having the first wavelength, the light beam having the second wavelength, and the light beam having the third wavelength are combined in a substantially collinear manner.

18. The information handling system of claim 10, wherein the second side further comprises a second optical filter.

19. The information handling system of claim 10, wherein the light beam having the first wavelength is substantially orthogonal to the light beam having the second wavelength prior to incidence of the light beams on the dichroic optic.

20. A method of combining light beams, comprising:
- providing a dichroic optic having a first side, a second side opposite to the first side, and a third side nonparallel to the first side and nonparallel to the second side, wherein the second side has an optical filter;
- each of a light beam having a first wavelength, a light beam having a second wavelength and a light beam having a third wavelength entering, exiting or reflecting from the dichroic optic from at least one of the first or second sides, and only exiting from the third side;
- the dichroic optic combining the light beam having the first wavelength and the light beam having the second wavelength to be substantially collinear in a first internal beam within the dichroic optic;
- the optical filter transmitting a first portion of the light beam having the first wavelength and a first portion of the light beam having the second wavelength, while reflecting second portions of the light beams having the first and second wavelengths, and reflecting a first portion of the light beam having the third wavelength, while transmitting a second portion of the light beam having the third wavelength;
- the dichroic optic combining the first portion of the light beam having the first wavelength, the first portion of the light beam having the second wavelength, and the first portion of the light beam having the third wavelength in a substantially collinear manner while emanating from the dichroic optic at the optical filter, wherein prior to incidence on the dichroic optic each of the light beams having the first, second or third wavelengths are non-collinear with each other; and
- the dichroic optic combining the second portions of the light beams having first, second, and third wavelengths in a substantially collinear manner in a second internal beam that exits the dichroic optic at the third side as a pickoff beam.

* * * * *